United States Patent [19]

McDonald

[11] 3,724,217
[45] Apr. 3, 1973

[54] ROCKET SYSTEM
[75] Inventor: Allan J. McDonald, Brigham City, Utah
[73] Assignee: Thiokol Chemical Corporation, Bristol, Pa.
[22] Filed: Oct. 6, 1971
[21] Appl. No.: 187,009

[52] U.S. Cl. ..................................60/254, 60/263
[51] Int. Cl. ..............................................F02k 9/04
[58] Field of Search........60/244, 254, 253, 224, 241, 60/207, 263, 225

[56] References Cited

UNITED STATES PATENTS

| | | | |
|---|---|---|---|
| 3,102,386 | 9/1963 | Proell | 60/254 |
| 3,059,425 | 10/1962 | McSherry et al. | 60/253 |
| 3,065,597 | 11/1962 | Adamson et al. | 60/254 |
| 3,349,563 | 10/1967 | Taylor et al. | 60/254 |

*Primary Examiner*—Douglas Hart
*Assistant Examiner*—Robert E. Garrett
*Attorney*—Edward E. McCullough

[57] ABSTRACT

An extinguishable, solid propellant rocket motor has a forward propellant grain in abutting relationship with an aft propellant grain, with a common perforation extending through both. The aft grain, primarily for propulsion, is much more energetic than the forward grain, which is primarily for furnishing gases for control mechanisms. A gas generator in communication with the forward end of the rocket motor is valved therewith so that, in cooperation with the rocket motor, a variety of operations are possible with gases being contributed by either or both the rocket motor and the gas generator for propulsion and control mechanisms.

7 Claims, 1 Drawing Figure

PATENTED APR 3 1973
3,724,217
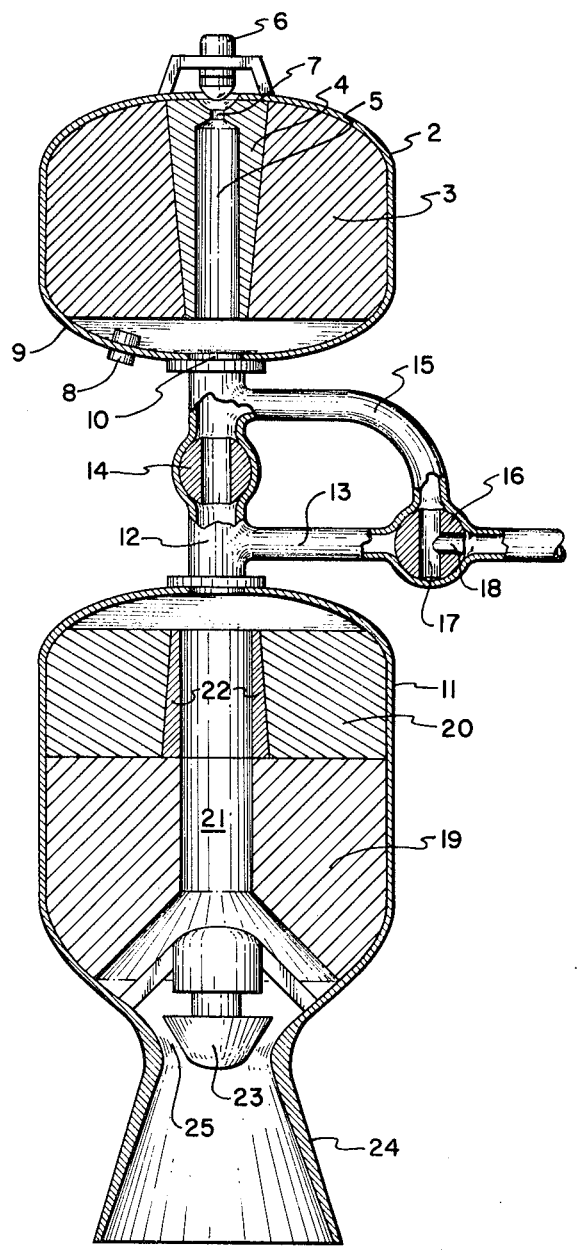
INVENTOR.
ALLAN J. McDONALD
BY
Edward E. McCullough
AGENT

ROCKET SYSTEM

BACKGROUND OF THE INVENTION

This invention relates to rocket motors, and particularly to upper stages thereof wherein various maneuvers may be necessary to alter the velocity, direction, or attitude of the vehicle. The invention herein described was made in the course of or under a contract with the U.S. Air Force.

In recent years a need has arisen for greater control of solid propellant rockets, regarding direction, velocity, and attitude of the vehicle. This is particularly true of the upper stages of ballistic missiles, the trajectory of which usually must be corrected to insure accuracy in delivery of the payload. Devices for controlling the attitude and direction of such upper stages usually require valving the gases. This in turn requires a special source of gas, because high energy propellants conventionally used for rocket propulsion typically yield very high temperatures containing erosive particles that tend to render valves inoperative. Hence, in prior art devices, propulsive gases could not be used for operating control mechanisms; and the cooler, cleaner gases used for control mechanisms could not be used economically for propulsion of the vehicle. The result was that gases and propellant were usually wasted, and such upper stages were far heavier than necessary in order to accommodate the extra propellant that would be wasted.

SUMMARY OF THE INVENTION

The present invention, which overcomes these difficulties of the prior art, is a system wherein a solid propellant rocket motor that is extinguishable is combined with a gas generator that is also extinguishable and reignitable. They are valved together in a manner that permits cooperation in performing a variety of functions pertaining to control and propulsion of the vehicle. The solid propellant rocket motor has a forward grain and an aft grain in abutting relationship with a central perforation extending the length of both grains. The forward grain is much less energetic than the aft grain, and produces cool, clean gases that may be valved safely into control devices. The same kind of gases are produced by the gas generator. The aft grain of the rocket motor is of the ordinary propulsion type and typically contains metallic fuel. In this way, either the gas generator or the rocket motor may contribute either singly or in combination to propulsion of the vehicle or to operation of control mechanisms thereof. Also, either the gas generator or the rocket motor can reignite the other, or they can both be nonoperative at the same time and can be reignited by the igniter of the gas generator.

Objects of the invention are to provide a rocket vehicle capable of altering its velocity, attitude, and direction and that will accomplish these functions without waste of propellant, whereby the total weight of the vehicle may be minimized. Important features of the invention are its versatility and its simplicity of construction.

Other objects and advantages of the invention will be noted as the following detailed description is read with reference to the accompanying drawings.

DESCRIPTION OF THE DRAWINGS

The FIGURE is essentially a longitudinal section of the system, some parts of which are schematically illustrated.

DESCRIPTION OF THE PREFERRED EMBODIMENTS

As shown in the FIGURE, a solid propellant gas generator 2 has a centrally perforated, solid propellant grain 3 that is cut away on the aft end and heavily coated with combustion inhibiting composition 4 to produce an end burning configuration. The propellant 3 is selected from any one of several known types that may be extinguished during combustion by sudden release of combustion chamber pressure. This release of pressure is accomplished by valve means 6 that is capable of opening and closing a port 7 in communication with the perforation 5 in the forward end of the gas generator 2. A repeating igniter 8 in the aft end of the case 9 of the gas generator 2 is capable of restarting combustion at any time after extinguishment thereof. The output orifice 10 of the gas generator 2 is connected to the forward end of the rocket motor 11 by a main pipe 12. This pipe 12 is provided with a branch pipe 13 for directing gases from the rocket motor and/or the gas generator to control devices for controlling the velocity, attitude and direction of the rocket system shown. A first valve means 14 in the pipe 12 is located between the gas generator 2 and the branch pipe 13. It may permit gas flow in either direction in the pipe 12 or may close the pipe completely to gas flow. A shunt pipe 15 joins the main pipe 12 between the gas generator 2 and the first valve 14; at its other end, it joins the branch pipe 13. This valve 16 has a through passage 17 and a branch passage 18, so that it can permit gas flow into the branch pipe 13 from either the gas generator 2, the motor 11, or both.

The rocket motor 11 has an aft, propulsive propellant grain 19 that is far more energetic than its forward, gas generator type, propellant grain 20 that abuts the aft grain 19. A common perforation 21 extends through both grains. The forward gas generator grain 20 is heavily coated with combustion inhibiting composition 22, and is cut back on its forward end to provide an end burning configuration. Valve means 23 in the nozzle 24 is capable of extinguishing the propellant of the rocket motor 11 by sudden release of pressure therein in a manner similar to the valve means 6 in the gas generator 2. It is also capable of modulating the thrust of the rocket motor 11, within limits, by varying the size of the throat 25 of the nozzle 24.

Because of the arrangements of the valves 14 and 16, and of the pipes 12, 13, and 15, it is apparent that gases can be made to flow from the gas generator 2 into the rocket motor 11 or vice versa, and that either or both may be made to discharge gases into the branch pipe 13. In this way, the functions of the gas generator 2 and the rocket motor 11 may be combined as desired to perform a great variety of functions for maximum conservation of propellant. Hence, either the gas generator 2 or the rocket motor 11 may be extinguished and reignited by the other that is in operation. If the igniter 8 is any one of the various known repeating varieties, both may be extinguished and the gas generator 2 may be reignited thereby.

Gas generator propellants, such as used in the gas generator 2 and the forward grain 20 of the rocket motor 11 are well known in the art of rocket technology, as are propellants that are extinguishable on release of pressure thereon. The combustion inhibiting compositions 4 and 22 may be any of the well known elastomeric sealants low in oxidizer content.

Being far more energetic than the forward grain 20 of the rocket motor 11, the gases from the aft grain 19 tend to compress those of the forward grain 20 at the forward end of the rocket motor 11 to provide additional pressure for operation of attitude and other control devices to which these gases are delivered by the branch pipe 13. Also, if needed, the gas generator 2 can be used to provide additional impulse for propulsion of the vehicle by directing gases therefrom directly through the rocket motor 11.

An invention has been described that advances the art of rocket technology, particularly in regard to control, and in conservation of propellant in upper stages thereof. Although the embodiment described has been specific with regard to detail, it should be noted that such details may be altered considerably without departing from the scope of the invention, as it is defined in the following claims.

The invention claimed is:

1. A rocket system comprising:
   an extinguishable gas generator having a case, an outlet orifice in the case, and a solid propellant therein;
   an extinguishable rocket motor having an aft, propulsive, solid propellant grain and a forward, gas generator type, solid propellant grain, with a common, central perforation extending axially through both grains;
   a main pipe joining the outlet orifice of the gas generator to the forward end of the rocket motor, so that the interior of the gas generator may be in communication with that of the rocket motor,
   a branch pipe joining the main pipe for directing gases from at least one of the rocket motor — gas generator combination to control devices;
   a first valve means in the main pipe for regulating gas flow between the rocket motor and the gas generator;
   a shunt pipe joining the main pipe between the first valve means and the gas generator and leading to a juncture with the branch pipe; and
   a second valve means at said juncture that may selectively permit gas flow from the gas generator, the rocket motor, and both into the branch pipe for delivery to control mechanisms.

2. The rocket system of claim 1 having a repeating type igniter adjacent the gas generator solid propellant, so that both the gas generator and the rocket motor may be inoperative simultaneously, if desired, and reignited.

3. The rocket system of claim 1 wherein the propellant grain of the gas generator is centrally perforated and cut back to expose an end burning surface, and further includes a combustion inhibiting composition on the sides of the perforation to maintain the end burning configuration on the propellant grain.

4. The rocket system of claim 3 wherein the case of the gas generator has a port in communication with the propellant perforation and further includes valve means in the part, whereby it may be opened to relieve pressure in the gas generator.

5. The rocket system of claim 1 wherein the forward, gas generator type propellant grain of the rocket motor is cut back on its forward end and is equipped with combustion inhibiting composition on the walls of the perforation thereof, to create an end burning surface thereon.

6. The rocket system of claim 5 further including valve means in the thrust nozzle of the rocket motor, whereby pressure within the rocket may be relieved to extinguish the propellant therein and thrust may be modulated.

7. A rocket system comprising:
   A gas generator having a case, a metal-free, centrally perforated, end burning, solid propellant grain, the perforation of which is protected from combustion by a coat of combustion inhibiting composition thereon;
   an igniter adjacent the end burning surface of the propellant; an outlet orifice in the case; a rocket motor having a case; a thrust nozzle;
   valve means in the thrust nozzle for relieving the pressure within the case and for modulating thrust;
   an aft, solid propellant, propulsive grain; and a forward, solid propellant, metal free, gas generator type propellant grain in abutting relationship with the aft propellant grain and cut back on the forward end thereof to create an end burning surface, a central perforation extending through both grains and coated with a combustion inhibiting composition on the forward grain;
   a main pipe joining the output orifice of the gas generator to the forward end of the rocket motor, joining the interior of the gas generator with that of the rocket motor;
   a first valve means in the main pipe to regulate the flow of gases between the gas generator and the rocket motor;
   a branch pipe joining the main pipe between the rocket motor and the first valve means;
   a shunt pipe joining the main pipe between the valve means and the gas generator and leading to a juncture with the branch pipe; and
   a second valve means at said juncture for selectively permitting flow from the gas generator, the rocket motor, and both through the branch pipe for use in operating control mechanisms.

* * * * *